(12) United States Patent
McClintock et al.

(10) Patent No.: US 10,007,792 B1
(45) Date of Patent: Jun. 26, 2018

(54) MODELING A NETWORK SECURITY ENVIRONMENT AS A GAME

(71) Applicant: Amazon Technologies, Inc., Reno, NV (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 772 days.

(21) Appl. No.: 14/092,553

(22) Filed: Nov. 27, 2013

(51) Int. Cl.
*G06F 21/31* (2013.01)
*G06F 21/57* (2013.01)
*H04L 29/06* (2006.01)

(52) U.S. Cl.
CPC ........ *G06F 21/577* (2013.01); *H04L 63/1416* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 2001/0027388 A1* | 10/2001 | Beverina | ............... | G06Q 20/203 703/22 |
| 2005/0125694 A1* | 6/2005 | Fakes | ............... | G06F 21/56 726/4 |
| 2006/0059113 A1* | 3/2006 | Kuznar | ............... | G06N 3/004 706/45 |
| 2006/0190228 A1* | 8/2006 | Johnson | ............... | G06F 17/5004 703/13 |
| 2007/0050758 A1* | 3/2007 | Arevalo | ............... | G06F 17/5022 717/135 |
| 2007/0083932 A1* | 4/2007 | Aniszczyk | ............... | A63F 13/10 726/25 |
| 2013/0203506 A1* | 8/2013 | Brown | ............... | G06Q 30/0203 463/42 |
| 2013/0318616 A1* | 11/2013 | Christodorescu | ....... | G06F 21/00 726/25 |
| 2014/0123300 A1* | 5/2014 | Jung | ............... | G06F 21/44 726/26 |
| 2014/0282823 A1* | 9/2014 | Rash | ............... | H04L 63/20 726/1 |
| 2015/0026594 A1* | 1/2015 | Dave | ............... | H04L 65/403 715/753 |

OTHER PUBLICATIONS

Chang et al., The Security System Design in Online Game for u Entertainment, 2008, IEEE, 5 pages.*
Kow et al., Designing Online Games for Real-life Relationships: Examining QQ Farm in Intergenerational Play, 2012, ACM, 4 pages.*

(Continued)

*Primary Examiner* — Jeffrey C Pwu
*Assistant Examiner* — Baotram Tram
(74) *Attorney, Agent, or Firm* — Thomas | Horstemeyer, LLP (57) ABSTRACT

Disclosed are various embodiments that model a network security environment as a game. A data model corresponding to a network security environment is received. A gaming environment is generated based at least in part on the data model. The gaming environment represents a decontextualized version of the network security environment.

19 Claims, 5 Drawing Sheets

(56) References Cited

OTHER PUBLICATIONS

Philip Ritchey, It's Not About Winning, It's About Sending a Message: Hiding Information in games, XRDS, 2013, vol. 20 No. 1, 5 pages.*
Wang et al., Towards a Framework for Privacy-Aware Mobile Crowdsourcing, 2013, IEEE, 6 pages.*
White et al., Game Theoretic Attack Analysis in Online Social Network (OSN) Services, 2013, ACM, 8 pages.*
Megaw et al., Phishing within E-Commerce: A Trust and Confidence Game, 2010, IEEE, 8 pages.*
U.S. Appl. No. 14/028,360, filed Sep. 16, 2013, and entitled "Crowdsourced Analysis of Decontextualized Data".
Hsu, et al., "SRI think tank and university turn software verification into gameplay", Gamesbeat, http://venturebeat.com/2013/12/09/sri-think-tank-and-university-turn-software-verification-into-gameplay/, Dec. 9, 2013.
Dean, "Crowd Sourced Formal Verification (CSFV)", DARPA, http://www.darpa.mil/Our_Work/I2O/Programs/Crowd_Sourced_Formal_Verification_%28CSFV%29.aspx.
"The Problem", Verigames, http://www.verigames.com/aboutUs.

* cited by examiner

MODELING A NETWORK SECURITY ENVIRONMENT AS A GAME

BACKGROUND

To identify errors, security breaches, or other anomalous behavior in computing systems, system administrators may implement automated checks. Such automated checks may be performed by processes that periodically execute to analyze performance data or other types of data captured during the operation of the computing system being checked. In many cases, the processes to implement automated checks may not be adequate to identify anomalous behavior in computing systems, particularly when the anomalous behavior is subtle or is indicated by patterns or correlations in the data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to modeling a network security environment as a game. Assessing the security present in a network security environment (e.g., an enterprise network or other network) can be challenging. In a network security environment, there may be thousands of different computer systems running different applications. These systems may be situated on a multitude of network segments coupled to many layers of networking devices such as firewalls, routers, switches, etc. Further, systems within the network security environment may be administered by several groups with different security policies. Automated tools such as intrusion detection systems and vulnerability scanners may be useful, but they are an incomplete security solution.

Various embodiments of the present disclosure facilitate a crowd-sourced evaluation of a network security environment. Human intelligence is able to solve problems in creative ways that are beyond the reach of automated tools. Nonetheless, for large-scale network security environments, hiring a sufficient quantity of competent network administrators to manually perform security evaluations may be cost-prohibitive. To this end, the network security environment may be decontextualized for security purposes and provided to users for crowd-sourced analysis. Various embodiments for decontextualizing data and performing crowd-sourced analysis upon the decontextualized data are described in U.S. patent application Ser. No. 14/028,360 filed on Sep. 16, 2013, and entitled "CROWDSOURCED ANALYSIS OF DECONTEXTUALIZED DATA," which is incorporated herein by reference in its entirety.

In order to attract users to perform the crowd-sourced analysis, the network security environment may be decontextualized and modeled in the form of a game. In one non-limiting example, a network may be modeled as a building, servers on the network may be modeled as rooms in the building, transmission control protocol (TCP) ports of a server may be modeled as doors of a room that are either closed or open, and so on. Permissions or access grants in the network may be modeled as physics rules in the game. Various non-player characters, corresponding to intrusion detection systems or other automated logic, may be released in the game environment. The results of the game (e.g., if a user gains access to treasure in a specific room by defeating a non-player character, etc.) may be interpreted as revealing security vulnerabilities in the network.

Figure 1:
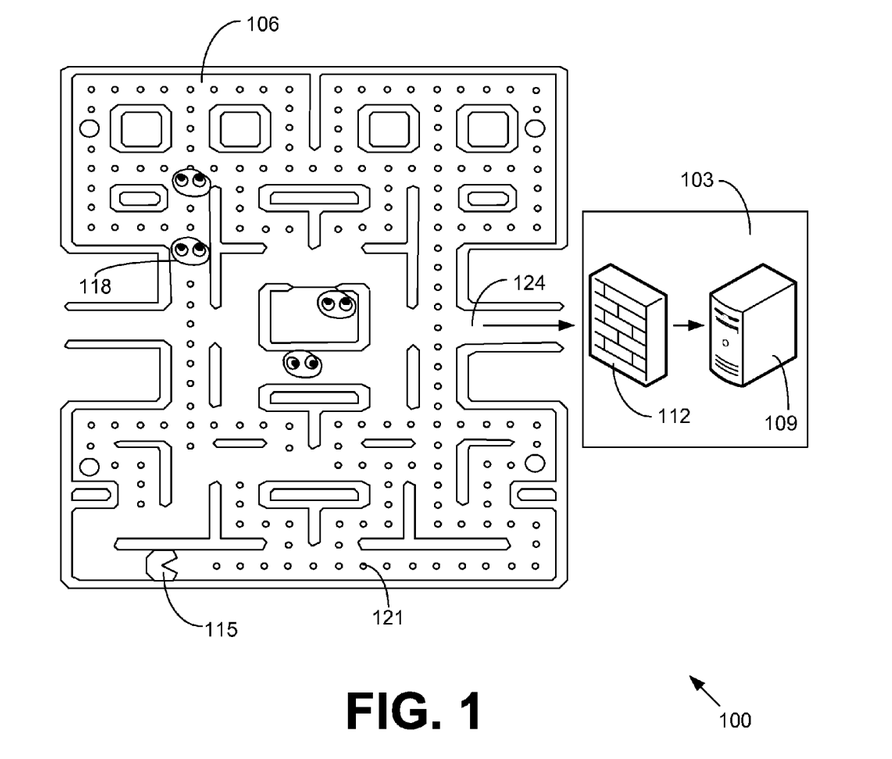
FIG. 1 is a drawing illustrating an exemplary scenario involving a network security environment modeled by a gaming environment according to various embodiments of the present disclosure.

Turning now to FIG. 1, shown is an example scenario 100 involving a network security environment 103 and a gaming environment 106 according to various embodiments. The example network security environment 103 includes a server 109 and a firewall 112, among potentially many other devices.

The gaming environment 106 may appear to the user to be an ordinary game. However, the gaming environment 106 is generated based at least in part on a model of the network security environment 103. Achievements in the gaming environment 106, such as defeating a "boss" character or gaining access to a secret room, may be correlated with events and entities within the network security environment 103. In this non-limiting example, the gaming environment 106 may include a player character 115 controlled by the user and non-player characters 118 that are controlled by automated logic. In the gameplay, the object of the game is for the player character 115 to gather tokens 121, while avoiding being captured by the non-player characters 118 that roam the gaming environment 106. Once all of the tokens 121 are gathered, the player character 115 can exit via the doorway 124 to proceed to another room.

Behind the scenes, various actions may be taken relative to a model of the network security environment 103, or even the actual network security environment 103 itself. The actions involved in exploring the maze and gathering tokens 121 in the gaming environment 106 may be correlated with attempts to gain access to devices within the network security environment 103. The non-player characters 118 may correspond to automated network monitoring logic, such as intrusion detection tools, etc. The moves of the player character 115 necessary to evade the non-player characters 118 may correspond to actions to evade the automated network monitoring logic.

The access permissions implemented by the firewall 112 and the server 109 may correspond to physics rules within the gaming environment 106. For example, the ability of the player character 115 to go through the doorway 124 or go through a wall or hidden portal may depend upon the access permissions of the network security environment 103. Exiting the doorway 124 may imply that the user has successfully evaded the automated network monitoring logic (i.e., the non-player characters 118) and has gained access to the server 109 via the firewall 112 (i.e., by violating the configured physics rules). In some examples, a portion of the gaming environment 106 (e.g., gathering a certain number of tokens 121, etc.) may be generated purely to keep the user interested in the gameplay and may be uncorrelated with entities or actions in the network security environment 103. In the following discussion, a general description of the system and its components is provided, followed by a discussion of the operation of the same.

Figure 2:
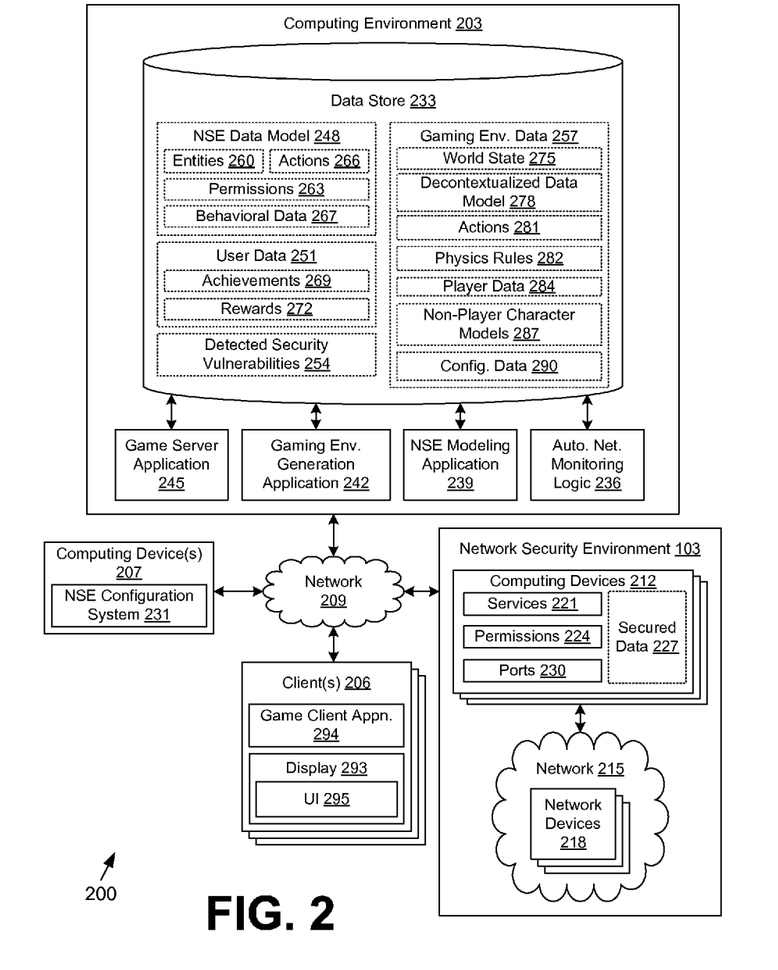
FIG. 2 is a schematic block diagram of a networked environment according to various embodiments of the present disclosure.

With reference to FIG. 2, shown is a networked environment 200 according to various embodiments. The networked environment 200 includes a network security environment 103, a computing environment 203, one or more clients 206, and one or more computing devices 207, which may be in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The network security environment 103 may correspond to an enterprise network, a government network, or any other secured network that is to be evaluated by the embodiments described herein. The network security environment 103 includes a plurality of computing devices 212 in data communication via a network 215. The network 215 may include, for example, the Internet, intranets, extranets, wide area networks (WANs), local area networks (LANs), wired networks, wireless networks, cable networks, satellite networks, or other suitable networks, etc., or any combination of two or more such networks. The network 215 may include a plurality of network devices 218. The network devices 218 may include firewalls, hubs, switches, routers, proxy servers, load balancers, gateways, and/or other types of devices that facilitate communication via the network 215.

The computing devices 212 may comprise, for example, server computers, client computers, or any other system providing computing capability. The computing devices 212 may be termed "hosts" on the network 215. Such computing devices 212 may be arranged, for example, in one or more server banks or computer banks or other arrangements. Such computing devices 212 may be located in a single installation or may be distributed among many different geographical locations. For example, two or more of the computing devices 212 together may comprise a hosted or "cloud" computing resource, a grid computing resource, and/or any other distributed computing arrangement. In some cases, the computing devices 212 may correspond to an elastic computing resource where the allotted capacity of processing, network, storage, or other computing-related resources may vary over time.

The computing devices 212 may be configured to execute various services 221. One or more services 221 may be internal, for servicing the computing device 212 or other computing devices 212 within the network security environment 103. One or more services 221 may be external, for servicing requests from clients 206 or other devices outside of the network security environment 103. The services 221 may include, for example, web services, email services, domain name system (DNS) services, file transfer protocol (FTP) services, authentication services, virtual private network (VPN) services, directory services, voice over internet protocol (VoIP) services, and so on.

The computing devices 212 may be associated with various permissions 224 that grant or deny access of users to services 221 and/or secured data 227 of the computing devices 212. The permissions 224 may include, for example, firewall rules, file permissions, service 221 permissions, and so on. In regard to secured data 227, the permissions 224 may include read, write, and/or execute permissions. The permissions 224 may specify access grants in regard to authenticated users, anonymous users, specific network addresses, and/or other approaches to identifying access requests from clients 206. The services 221 of the computing devices 212 may listen on various ports 230. The ports 230 may include user datagram protocol (UDP) ports, transmission control protocol (TCP) ports, and/or other ports. Such ports 230 may be open, closed, or in another state.

It is understood that one or more of the network devices 218 may be associated with services 221, permissions 224, secured data 227, and ports 230. For example, a network device 218 that is a router may execute a management service 221 that facilitates management of the router for certain authenticated administrative users.

The computing device 207 may comprise, for example, server computers, client computers, or any other system providing computing capability. Such computing devices 207 may be arranged, for example, in one or more server banks or computer banks or other arrangements. Such computing devices 207 may be located in a single installation or may be distributed among many different geographical locations. For example, two or more of the computing devices 207 together may comprise a hosted or "cloud" computing resource, a grid computing resource, and/or any other distributed computing arrangement. In some cases, the computing devices 207 may correspond to an elastic computing resource where the allotted capacity of processing, network, storage, or other computing-related resources may vary over time.

The computing devices 207 may be configured to execute one or more network security environment (NSE) configuration system 231. The NSE configuration system 231 provides status and/or configuration information about the network security environment 103. The NSE configuration system 231 may include, for example, computer hardware inventory systems, firewall rule management systems, and/or other systems.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time. Although the computing environment 203 is shown separately from the network security environment 103, it is understood that one or more components of the computing environment 203 may be within the network security environment 103.

Various applications and/or other functionality may be executed in the computing environment 203 according to various embodiments. Also, various data is stored in a data store 233 that is accessible to the computing environment 203. The data store 233 may be representative of a plurality of data stores 233 as can be appreciated. The data stored in the data store 233, for example, is associated with the operation of the various applications and/or functional entities described below.

The components executed on the computing environment 203, for example, include automatic network monitoring logic 236, a network security environment (NSE) modeling application 239, a gaming environment generation application 242, a game server application 245, and other applications, services, processes, systems, engines, or functionality not discussed in detail herein. The automatic network monitoring logic 236 is executed to monitor the network security environment 103. To this end, the automatic network monitoring logic 236 may include intrusion detection systems, "honeypot" systems, vulnerability scanners, and/or other logic designed to automatically detect vulnerabilities in the network security environment 103 and/or abnormal or malicious network traffic or system usage within the network security environment 103. Vulnerabilities may include, for example, old versions of services 221 that are susceptible to exploits, improper configurations of services 221, improper firewall rules, and so on. Malicious behavior may include denial of service attacks, attempted usage of exploits, unauthorized connection attempts to ports 230, and/or any other unauthorized network traffic. The automatic network monitoring logic 236 may perform various actions such as updating firewall rules for network address-level permissions 224, updating user-level permissions 224, sending notifications to administrators, upgrading old software, disconnecting a host from the network 215, and so on.

The NSE modeling application 239 may be executed to dynamically generate a data model of the network security environment 103. To this end, the NSE modeling application 239 may probe the network security environment 103 and/or acquire profiling data from one or more data sources such as NSE configuration systems 231. In this way, the NSE modeling application 239 is able to create a mapping of the network security environment 103 that includes the various computing devices 212, network devices 218, services 221, permissions 224, ports 230, and/or other aspects of the network security environment 103. In some embodiments, the automatic network monitoring logic 236 may be configured to act upon such a data model rather than the actual network security environment 103.

The gaming environment generation application 242 is configured to generate a gaming environment 106 (FIG. 1) from the data model of the network security environment 103. Such a data model may be manually created and/or dynamically generated by the NSE modeling application 239. To generate the gaming environment 106, the gaming environment generation application 242 is configured to decontextualize the data model of the network security environment 103. For example, depending on the desired gaming environment 106, the gaming environment generation application 242 may translate computing devices 212 into rooms, buildings, mazes, fields, forests, and/or other arenas.

The data model of the network security environment 103 is thus decontextualized in the sense that it may not be apparent that the rooms, buildings, mazes, fields, forests, and/or other arenas in fact represent the computing devices 212 of the network security environment 103. The gaming environment generation application 242 may generate a portion of the gaming environment 106 that does not represent the data model of the network security environment 103 for the purpose of maintaining user interest and making the game exciting. For example, the gaming environment generation application 242 may be configured by a level of difficulty.

The game server application 245 is configured to facilitate gameplay for the gaming environment 106 with one or more players at clients 206 via the network 209. To this end, users at the clients 206 may log-on via the game server application 245. The game server application 245 may send information about the current state of the gaming environment 106 to the clients 206, and in return, the clients 206 may send instructions corresponding to requested gameplay in the gaming environment 106. Further, the game server application 245 or associated logic may be capable of "re-contextualizing" the gaming environment 106 in order to detect security vulnerabilities or other issues based at least in part on the gameplay.

The data stored in the data store 233 includes, for example, a network security environment (NSE) data model 248, user data 251, detected security vulnerabilities 254, gaming environment data 257, and potentially other data. The NSE data model 248 may correspond to a data model that is manually created or dynamically generated by the NSE modeling application 239. The NSE data model 248 may include, for example, entities 260, permissions 263, actions 266, behavioral data 267, and/or other data. The entities 260 are used to model the computing devices 212, services 221, network devices 218, segments of the network 215, the secured data 227, and/or other aspects of the network security environment 103. The permissions 263 may correspond to the permissions 224 and/or other access grants that are inferred or discovered regarding the network security environment 103. The actions 266 correspond to the actions that may be performed in the network security environment 103, e.g., exploits that can be executed (successfully or unsuccessfully), packets that can be sent, commands that can be issued, etc. The behavioral data 267 may monitor network behavior, such as network traffic flows, utilization of elastic computing resources, and so on.

The user data 251 includes data related to users of the game server application 245. Such data may include, for example, achievements 269, rewards 272, and/or other data. Achievements 269 may correspond to tasks that have been successfully completed by a user in a gaming environment 106. Such tasks may include collecting a certain quantity of tokens 121 (FIG. 1), defeating a certain non-player character 118 (FIG. 1), defeating a certain quantity of non-player characters 118, violating a physics rule, entering a secret area, discovering treasure, and/or performing other tasks.

Rewards 272 may correspond to incentives provided to users in response to the users earning the achievements 269. The incentives may correspond to real currency, virtual currency, prizes, in-game weapons or tools, and/or other incentives. For example, if a user gains access to a hidden room, the user may be credited with a financial reward 272. In reality, the user gaining access to the hidden room in the gaming environment 106 may correlate with the user gaining access to important secured data 227 in the network security environment 103. Thus, the financial reward 272 may be a worthwhile investment for the operator of the network security environment 103 in order to detect the vulnerability.

The detected security vulnerabilities 254 correspond to the security issues with the network security environment 103 that were discovered as a result of gameplay facilitated by the game server application 245. Such detected security vulnerabilities 254 may be logged for further manual analysis. Alternatively, various logic may implement automated solutions to address the issues revealed by the detected security vulnerabilities 254. This may include modifying firewall rules, modifying file permissions, upgrading exploitable or otherwise insecure software, and/or other solutions.

The gaming environment data 257 corresponds to a data model of the gaming environment 106 and other associated data. The data may include a world state 275, a decontextualized data model 278, actions 281, physics rules 282, player data 284, non-player character models 287, configuration data 290, and/or other data. The world state 275 may correspond to a current state of a gaming environment 106, including locations of player characters 115 (FIG. 1), locations of non-player characters 118, tokens 121 gathered, rooms visited, power-ups earned, character health, active weapons and armor, points earned, and/or other state information related to gameplay. The decontextualized data model 278 corresponds to the data model of the gaming environment 106 that is generated from the NSE data model 248. The data model may describe a world, including forests, fields, buildings, roads, lighting, non-player characters 118, and/or aspects of the game, some or all of which may be correlated to aspects of the network security environment 103. The behavioral data 267 may be decontextualized such that network traffic, elastic resource utilization, etc. may be modeled in the gaming environment 106 as varying pathway width, varying lighting, and so on.

The actions 281 may correspond to the actions or behavior that may be performed within the gaming environment 106. Such actions 281 may include walking, running, jumping, punching, firing weapons, ducking, changing weapons, using armor, and/or other actions. Actions 281 may be performed by the player characters 115 and/or the non-player characters 118, and one or more actions 281 may be exclusive to each. Some actions 281 may or may not be performed based at least in part on the current world state 275. Some or all of the actions 281 may be correlated with actions 266 of the NSE data model 248. As a non-limiting example, firing a grenade launcher at a door may be correlated with attempting to execute an exploit against a service 221 in the network security environment 103.

The physics rules 282 may indicate what the player characters 115 and/or non-player characters 118 are allowed to do, or are not allowed to do, within the gaming environment 106. For example, according to the physics rules 282, a character may not be allowed to penetrate a wall or a locked door. Some or all of the physics rules 282 may be correlated with permissions 263. To continue the example, a firewall rule that blocks the user's network address may correspond to preventing the character from penetrating the wall or the locked door.

The player data 284 may associate a user with a current player character 115 in the gaming environment 106. Additionally, the player data 284 may associate the player character 115 with a network address (e.g., of the client 206 or another network address), a user, and/or other information that may be used to grant or deny access to features of the gaming environment 106 (and corresponding features of the network security environment 103).

The non-player character models 287 may correspond to artificial intelligence models and state for non-player characters 118 in the gaming environment 106. Such non-player characters 118 may correspond to bosses, monsters, villains, opposing fighters, distracting items, and/or other characters. In one embodiment, the behavior of a non-player character model 287 may correspond to a representation of automated network monitoring logic 236 operating on the actual network security environment 103 or the NSE data model 248. As a non-limiting example, if an action 281 by a player character 115 results in a successful detection by an intrusion detection system, a non-player character 118 may appear to capture the player character 115. Similarly, assuming that a non-player character 118 models an intrusion detection system, the player may be able to execute a series of moves in order to defeat the non-player character 118. In some cases, the logic behind the non-player characters 118 may be able to share information, and this may be represented in the gaming environment 106 by the non-player characters 118 communicating by walkie-talkies, etc.

In a properly administered network segment, it may be the case that such a non-player character 118 that accurately models the automated network monitoring logic 236 may be undefeatable. Undefeatable non-player characters 118 may cause the user to lose interest in the gameplay. Thus, the non-player character models 287 may be configured based at least in part on a level of difficulty such that the non-player character 118 is capable of being defeated (according to the configured level of difficulty), even when the automated network monitoring logic 236 cannot be circumvented.

The configuration data 290 includes various configuration parameters that facilitate configuration of the gaming environment 106 as well as generation of the gaming environment 106 by the gaming environment generation application 242. To this end, the configuration data 290 may include mappings between NSE data model 248 features and gaming environment data 257. Thus, the configuration data 290 may specify that a particular entity 260 is to be rendered, for example, as a room in the decontextualized data model 278. Conversely, the configuration data 290 may specify that a particular room in the decontextualized data model 278 is mapped to an entity 260 in the NSE data model 248.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 293. The display 293 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a game client application 294 and/or other applications. The game client application 294 is configured to communicate with the game server application 245 via the network 209 and facilitate gameplay by a user via the client 206. To this end, the game client application 294 renders a user interface 295 upon the display 293. In one embodiment, the game client application 294 generates audio and/or visuals for the gaming environment 106 within the client 206. In another embodiment, the game client application 294 renders a media stream sent to the client 206 by the game server application 245. The game client application 294 also receives a sequence of commands from the user (e.g., "up," "up," "down," "down," etc.) and transmits the commands to the game server application 245 via the network 209. The client 206 may be configured to execute applications beyond the game client application 294 such as, for example, email applications, social networking applications, word processors, spreadsheets, and/or other applications.

Next, a general description of the operation of the various components of the networked environment 200 is provided. To begin, an NSE data model 248 is created to model an existing or proposed network security environment 103. In this regard, a user may manually specify the entities 260, permissions 263, and actions 266 of the NSE data model 248, or an NSE modeling application 239 may dynamically generate the entities 260, permissions 263, and actions 266 of the NSE data model 248 from network probing and/or other current data from data sources.

The gaming environment generation application 242 then generates the gaming environment data 257 for implementing a gaming environment 106 based at least in part on the NSE data model 248. The gaming environment data 257 includes a decontextualized data model 278 that represents a decontextualized version of the NSE data model 248. In some situations, multiple different versions of the gaming environment data 257 may be generated for a single NSE data model 248, with the different versions corresponding to different types of games.

Once the gaming environment data 257 for the gaming environment 106 is available, the game server application 245 facilitates gameplay for the gaming environment 106. Users at clients 206 may execute game client applications 294 that connect via the network 209 to the game server application 245 in order to participate. The game client applications 294 send commands to the game server application 245, and the game server application 245 sends rendering instructions to the game client applications 294. Various functionality ascribed herein to the game server application 245 may be implemented by the game client applications 294 in various embodiments. For example, the game client applications 294 may implement a peer-to-peer gaming system for gameplay, with information being sent back to the game server application 245 for the purpose of detecting security issues in the correlated NSE data model 248.

As part of facilitating gameplay, the game server application 245 may generate non-player characters 118 in the gaming environment 106 based at least in part on the non-player character models 287. These non-player characters 118 may correspond to automated logic such as automated network monitoring logic 236. Therefore, defeating or avoiding such non-player characters 118 via the gameplay may correspond to defeating intrusion detection systems and other automated network monitoring logic 236.

From the gameplay, security of the network security environment 103 may be assessed, and various detected security vulnerabilities 254 may be ascertained. These detected security vulnerabilities 254 may correspond to violations of the physics rules 282 or otherwise gaining access to areas, or performing actions 281, that correlate to secured or protected resources in the network security environment 103. Various actions, such as logging, reporting, or repairing, may be performed in response to the detected security vulnerabilities 254.

In the gameplay, various achievements 269 may be tracked for users. For example, performing a sequence of actions 281 that result in detecting a security vulnerability may be considered an achievement 269. The achievements 269 may be represented in the game with a particular award-type scenario, or providing the player character 115 with additional powers, points, resources, etc. Rewards 272 may accrue to the user in response to achievements 269. In some scenarios, the user may perceive that he or she has won the game, when in fact the user has discovered an important security vulnerability in an enterprise network. That is to say, the underlying context of the game may be hidden from the user.

Additionally, in some embodiments, it is noted that actions 281 performed by users in the gaming environment 106 may have real-world effects in the network security environment 103. That is to say, rather than operating purely upon a virtual data model, the actions 266 corresponding to the actions 281 may be performed in the actual network security environment 103 to determine a result. For example, a user who fires a machine gun in the gaming environment 106 may trigger the sending of an exploit in the network security environment 103 to a service 221. The response of the service 221 to the exploit may be determined and modeled in the game as a success or failure of the bullets to blow up a target in the gaming environment 106.

Figure 3:
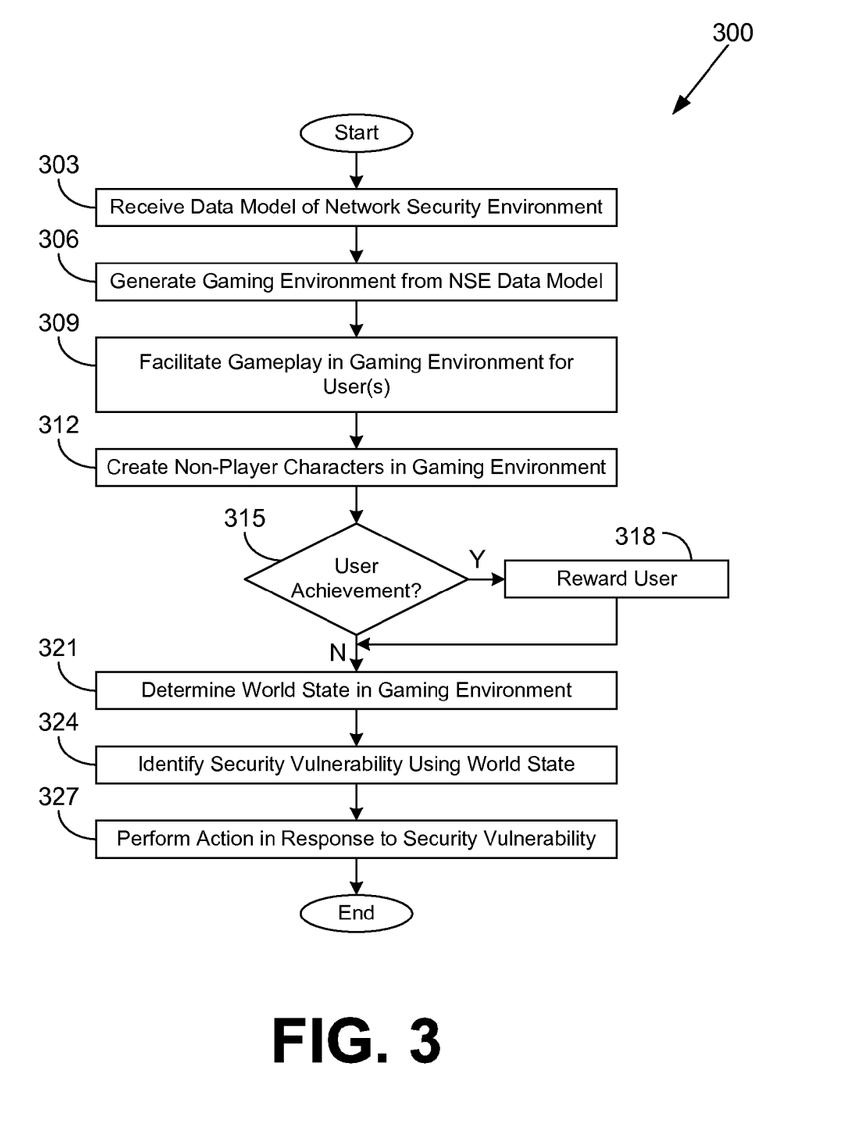
FIGS. 3 and 4 are flowcharts illustrating examples of functionality implemented as portions of a gaming environment generation application and a game server application executed in a computing environment in the networked environment of FIG. 2 according to various embodiments of the present disclosure.

Referring next to FIG. 3, shown is a flowchart 300 that provides one example of the operation of portions of the gaming environment generation application 242 (FIG. 2) and the game server application 245 (FIG. 2) according to various embodiments. It is understood that the flowchart 300 of FIG. 3 provides merely an example of the many different types of functional arrangements that may be employed to implement the operation of the portions of the gaming environment generation application 242 and the game server application 245 as described herein. As an alternative, the flowchart 300 of FIG. 3 may be viewed as depicting an example of elements of a method implemented in the computing environment 203 (FIG. 2) according to one or more embodiments.

Beginning with box 303, the gaming environment generation application 242 receives a network security environment (NSE) data model 248 (FIG. 2). The NSE data model 248 may be manually created or dynamically generated by the NSE modeling application 239 (FIG. 2) based at least in part on network probing, dynamic data sources of network state data, and/or other data. In box 306, the gaming environment generation application 242 generates a gaming environment 106 (FIG. 2) from the NSE data model 248. It is understood that many different gaming environments 106 may be created for a single NSE data model 248. As non-limiting examples, the gaming environments 106 may include first-person shooter games, adventure games, puzzle games, and/or other types of games as can be appreciated. The gaming environments 106 may be single player or multi-player.

In generating the gaming environment 106, the gaming environment generation application 242 consumes the NSE data model 248 and applies a decontextualization as configured by the configuration data 290 (FIG. 2). The resulting decontextualized data model 278 may then be made available for gameplay. It is noted that portions of the gaming environment 106 may correlate to the NSE data model 248, while other portions may not. Such non-correlating features may be added to make the game more interesting to users. The world state 275 (FIG. 2) may be initialized by the gaming environment generation application 242 with a default state.

Figure 4:
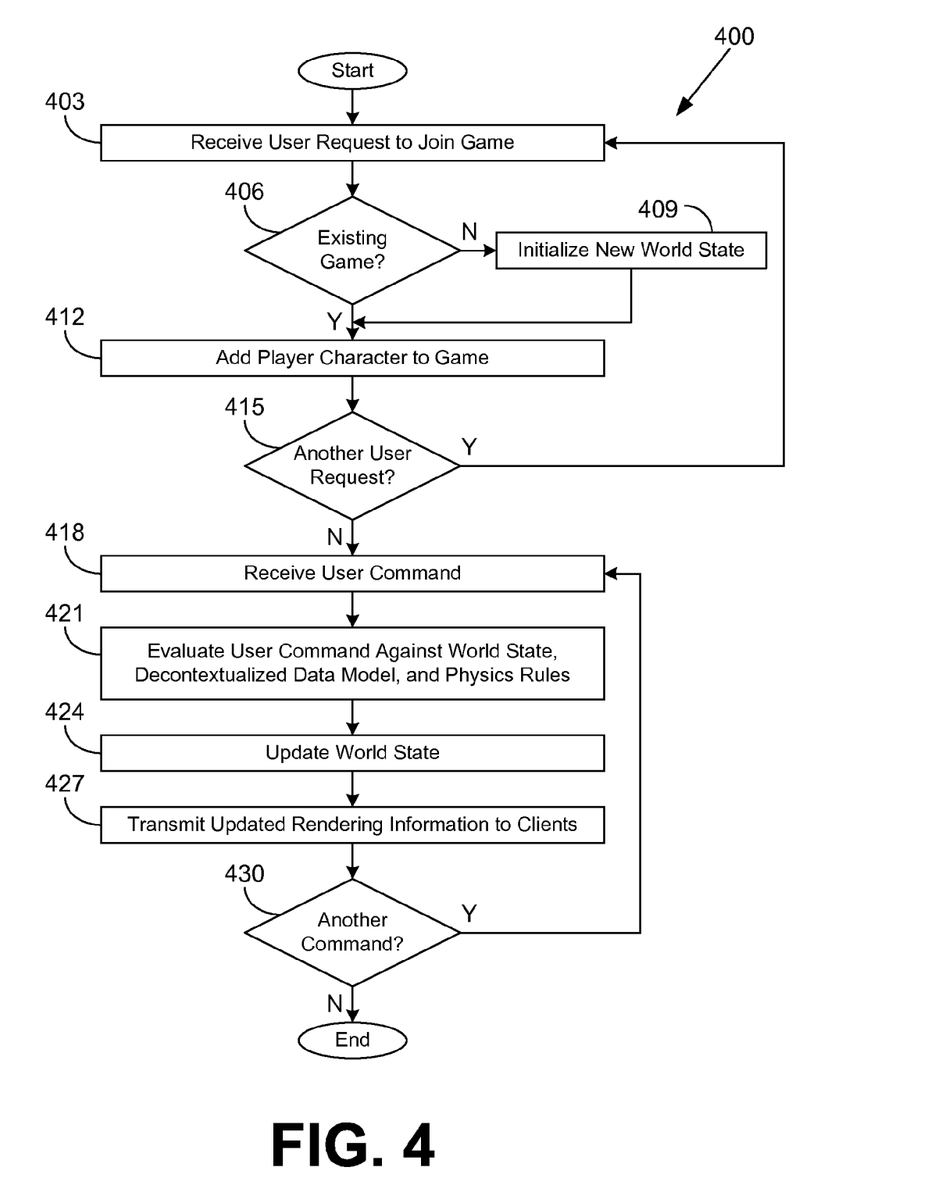

In box 309, the game server application 245 (FIG. 2) facilitates gameplay in the gaming environment 106 for one or more users at clients 206 (FIG. 2). In this respect, the game server application 245 may listen for requests by users to join a game. The game server application 245 may facilitate starting a new game with a new world state 275 or joining an existing game with an existing world state 275. In one embodiment, rendering instructions may be generated by the game server application 245 and sent via the network 209 (FIG. 2) to the clients 206, for rendering by the game client applications 294 (FIG. 2). The game server application 245 may receive commands from the game client applications 294, which are then applied to the world state 275. Additional tasks involved in facilitating gameplay are represented in the flowchart of FIG. 4.

In box 312, the gaming environment generation application 242 may create one or more non-player characters 118 (FIG. 1) in the gaming environment 106 according to non-player character models 287 (FIG. 2). In this regard, while facilitating gameplay, the game server application 245 may execute automated network monitoring logic 236 (FIG. 2) (or other logic backing non-player character models 287), and then update the non-player character models 287 based at least in part on the decisions made by the automated network monitoring logic 236.

In box 315, the game server application 245 determines whether a user has earned an achievement 269 (FIG. 2) in the gaming environment 106. If the user has earned an achievement 269, the game server application 245 proceeds to box 318 and then may provide a reward 272 (FIG. 2) to the user based at least in part on the achievement 269. The game server application 245 continues to box 321.

In box 321, the game server application 245 determines the world state 275 (FIG. 2) in the gaming environment 106. In box 324, the game server application 245 identifies one or more detected security vulnerabilities 254 (FIG. 2) in the network security environment 103 based at least in part on the world state 275. The world state 275 may indicate, for example, that one or more physics rules 282 (FIG. 2) for the gaming environment 106 have been violated. The violated physics rules 282 may correspond to permissions 263 (FIG. 2) of the NSE data model 248 that have been bypassed, thereby indicating a security issue. As a non-limiting example, the world state 275 may indicate that the user's player character 115 has gained access to a hidden room. The hidden room may correlate to a protected server 109 (FIG. 1) behind a firewall 112 (FIG. 2). Thus, the user's entrance into the hidden room may correspond to a security issue. Further, a defeat of a putatively undefeatable non-player character 118 as recorded in the world state 275 may correspond to a defeat of a security mechanism, such as automated network monitoring logic 236.

In box 327, the game server application 245 performs one or more actions in response to the detected security vulnerabilities 254. The game server application 245 or other logic executable in the computing environment 203 may be configured to fix one or more of the detected security vulnerabilities 254. For example, firewall rules may be created to block access to vulnerable entities 260, vulnerable services 221 may be upgraded, permissions 263 may be added or removed, and so on. The game server application 245 or other logic executable in the computing environment 203 may log the detected security vulnerabilities 254 and/or send notifications to administrators. Of particular interest to the administrators may be the sequence of commands issued by the user that prompted the discovery of the detected security vulnerability 254. Such commands may be translated from actions 281 (FIG. 2) relative to the gaming environment 106 into actions 266 (FIG. 2) relative to the NSE data model 248, per the configuration data 290. Thereafter, the flowchart 300 ends.

Turning now to FIG. 4, shown is a flowchart 400 that provides one example of the operation of a portion of the game server application 245 (FIG. 2) according to various embodiments. It is understood that the flowchart 400 of FIG. 4 provides merely an example of the many different types of functional arrangements that may be employed to implement the operation of the portion of the game server application 245 as described herein. As an alternative, the flowchart 400 of FIG. 4 may be viewed as depicting an example of elements of a method implemented in the computing environment 203 (FIG. 2) according to one or more embodiments.

Beginning with box 403, the game server application 245 receives a user request from a client 206 (FIG. 2) to join a game corresponding to a gaming environment 106 (FIG. 1). The request may specify one of several types of games that are available via the game server application 245. In some embodiments, the user may be required to have an existing account and be authenticated. Such accounts may be free or provided for a fee. In box 406, the game server application 245 determines whether the user is to join an existing game or a new game. If the user is to join a new game, the game server application 245 continues to box 409 and initializes a new world state 275 (FIG. 2). The game server application 245 then proceeds to box 412. If the user is to join an existing game, the game server application 245 proceeds from box 406 to box 412.

In box 412, the game server application 245 adds a player character 115 (FIG. 2) corresponding to the user to the game. In box 415, the game server application 245 determines whether another user request to join is received. If another user request to join is received, the game server application 245 returns to box 403. Otherwise, the game server application 245 continues to box 418.

In box 418, the game server application 245 receives a user command. In box 421, the game server application 245 may evaluate the user command against the world state 275, the decontextualized data model 278 (FIG. 2), the physics rules 282 (FIG. 2), and/or other data. In box 424, the game server application 245 updates the world state 275 with the action 281 (FIG. 2) corresponding to the evaluated command. In box 427, the game server application 245 transmits updated rendering information to the clients 206. In box 430, the game server application 245 determines whether another command is received. If another command is received, the game server application 245 returns to box 418. Otherwise, the flowchart 400 ends.

Figure 5:
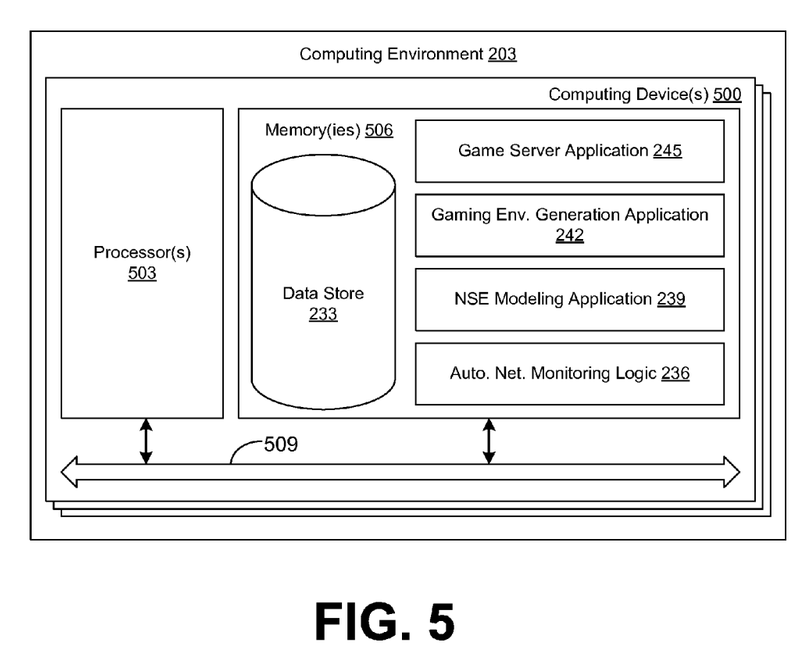
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the automated network monitoring logic 236, the network security environment modeling application 239, the gaming environment generation application 242, the game server application 245, and potentially other applications. Also stored in the memory 506 may be a data store 233 and other data. In addition, an operating system may be stored in the memory 506 and executable by the processor 503. It is understood that the clients 206 (FIG. 2) and the computing devices 212 (FIG. 2) may be implemented by hardware similar to that of the computing devices 500.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the automated network monitoring logic 236, the network security environment modeling application 239, the gaming environment generation application 242, the game server application 245, the game client application 294 (FIG. 2), the services 221 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the game server application 245 and the gaming environment generation application 242. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the automated network monitoring logic 236, the network security environment modeling application 239, the gaming environment generation application 242, the game server application 245, the game client application 294, and the services 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the automated network monitoring logic 236, the network security environment modeling application 239, the gaming environment generation application 242, the game server application 245, the game client application 294, and the services 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate a data model of a network security environment;
   generate a gaming environment based at least in part on the data model, the gaming environment representing a decontextualized version of the network security environment, wherein at least one physics rule in the gaming environment is based at least in part on at least one access permission in the network security environment;
   generate a plurality of non-player characters in the gaming environment, the plurality of non-player characters corresponding to automated monitoring logic;
   facilitate networked gameplay by a plurality of users in the gaming environment, the plurality of users being associated with a plurality of client devices;
   determine a world state of the gaming environment as manipulated by the gameplay of the plurality of users;
   identify a security vulnerability in the network security environment based at least in part on a violation of the at least one physics rule in the gaming environment; and
   perform an action in response to identifying the security vulnerability.

2. The non-transitory computer-readable medium of claim 1, wherein the network security environment comprises a plurality of computing devices, and individual ones of the plurality of computing devices are mapped to corresponding decontextualized entities within the gaming environment.

3. A system, comprising:
   at least one computing device; and
   at least one application executed in the at least one computing device, the at least one application causing the at least one computing device to at least:
      generate a gaming environment, at least a portion of the gaming environment representing a decontextualized version of a network security environment;
      generate at least one non-player character in the gaming environment, wherein behavior of the at least one non-player character is controlled based at least in part on a representation of an automated monitoring tool;
      assess security of the network security environment based at least in part on activity in the gaming environment; and
      perform an action in response to assessing the security of the network security environment.

4. The system of claim 3, wherein the gaming environment is generated based at least in part on a dynamic data model of the network security environment.

5. The system of claim 3, wherein the at least one application further causes the at least one computing device to at least facilitate logic that facilitates gameplay by at least one user in the gaming environment.

6. The system of claim 3, wherein a first action initiated by a user relative to a first entity in the gaming environment is correlated to a possible second action relative to a second entity in the network security environment.

7. The system of claim 3, wherein assessing the security of the network security environment further comprises determining whether a character in the gaming environment has violated at least one physics rule in the gaming environment, the at least one physics rule corresponding to at least one access permission in the network security environment.

8. The system of claim 3, wherein assessing the security of the network security environment further comprises assessing the security of the network security environment based at least in part on a world state in the gaming environment.

9. The system of claim 3, wherein the at least one non-player character comprises a plurality of non-player characters, and a first one of the plurality of non-player characters is configured to share information with a second one of the plurality of non-player characters.

10. The system of claim 3, wherein the at least one application further causes the at least one computing device to reward a user in response to determining that the user has earned an achievement in the gaming environment, the achievement corresponding to a detection of a security vulnerability in the network security environment.

11. A method, comprising:
   receiving, via at least one of one or more computing devices, a data model corresponding to a network security environment;
   generating, via at least one of the one or more computing devices, a gaming environment based at least in part on the data model, the gaming environment representing a decontextualized version of the network security environment;
   generating, via at least one of the one or more computing devices, at least one non-player character in the gaming environment, wherein behavior of the at least one non-player character is controlled based at least in part on a representation of an automated monitoring tool; and
   performing, via at least one of the one or more computing devices, an action in the network security environment based at least in part on a player interaction with the at least one non-player character.

12. The method of claim 11, wherein generating the gaming environment further comprises generating, via at least one of the one or more computing devices, a first portion of the gaming environment corresponding to the decontextualized version of the network security environment and a second portion of the gaming environment not corresponding to the decontextualized version of the network security environment.

13. The method of claim 11, wherein the data model includes a plurality of access permissions for the network security environment, and generating the gaming environment further comprises generating, via at least one of the one or more computing devices, a plurality of physics rules of the gaming environment based at least in part on the plurality of access permissions.

14. The method of claim 11, further comprising translating, via at least one of the one or more computing devices, a first action relative to a first entity in the gaming environment performed by a user into a possible second action relative to a second entity in the network security environment, the first entity corresponding to the second entity.

15. The method of claim 14, further comprising initiating, via at least one of the one or more computing devices, the possible second action in response to the first action.

16. The method of claim 11, wherein the gaming environment comprises a multi-player gaming environment, and the method further comprises facilitating, via at least one of the one or more computing devices, gameplay by a plurality of users in the multi-player gaming environment.

17. The method of claim 11, further comprising dynamically generating, via at least one of the one or more computing devices, the data model based at least in part on currently available data describing at least a portion of the network security environment.

18. The method of claim 11, further comprising:
   determining, via at least one of the one or more computing devices, a world state of the gaming environment as manipulated by a gameplay of a user; and
   identifying, via at least one of the one or more computing devices, at least one security vulnerability in the network security environment based at least in part on the world state.

19. The method of claim 11, wherein the at least one non-player character comprises a plurality of non-player characters, and a first one of the plurality of non-player characters is configured to share information with a second one of the plurality of non-player characters.

* * * * *